United States Patent
Yun et al.

(10) Patent No.: US 7,023,120 B2
(45) Date of Patent: Apr. 4, 2006

(54) GENERATING MOTOR USING MAGNETISM'S VECTOR

(76) Inventors: Jae-Shin Yun, 101-909 Samick Seremic Apt. 184 Gil 2-dong, Kangdong-gu, Seoul (KR) 134-809; Jae-Won Yun, 101-909 Samick Seremic Apt. 184 Gil 2-dong, Kangdong-gu, Seoul (KR) 134-809

( * ) Notice: Subject to any disclaimer, the term of this patent is extended or adjusted under 35 U.S.C. 154(b) by 0 days.

(21) Appl. No.: 10/514,182

(22) PCT Filed: May 6, 2004

(86) PCT No.: PCT/KR2004/001047

§ 371 (c)(1),
(2), (4) Date: Nov. 10, 2004

(87) PCT Pub. No.: WO2004/107542

PCT Pub. Date: Dec. 9, 2004

(65) Prior Publication Data

US 2005/0162033 A1    Jul. 28, 2005

(30) Foreign Application Priority Data

May 27, 2003 (KR) ...................... 10-2003-0033618

(51) Int. Cl.
*H02K 21/12* (2006.01)
*H02K 1/00* (2006.01)
*H02K 3/00* (2006.01)

(52) U.S. Cl. ................................ 310/156.43; 310/112
(58) Field of Classification Search ................ 310/216, 310/261, 156.38, 156.43, 156.45, 156.46, 310/156.36, 112, 113, 114
See application file for complete search history.

(56) References Cited

U.S. PATENT DOCUMENTS

| | | | | |
|---|---|---|---|---|
| 2,145,791 | A * | 1/1939 | Gille | 310/258 |
| 3,700,942 | A * | 10/1972 | Alth | 310/164 |
| 5,233,251 | A * | 8/1993 | Nehmer | 310/167 |
| 6,455,976 | B1 | 9/2002 | Nakano | |
| 6,504,285 | B1 * | 1/2003 | Yun | 310/261 |
| 2002/0047418 | A1 | 4/2002 | Seguchi et al. | |
| 2002/0113513 | A1 | 8/2002 | Yun | |
| 2003/0102754 | A1 | 6/2003 | Yun | |

FOREIGN PATENT DOCUMENTS

| | | |
|---|---|---|
| JP | 8-107636 A | 4/1996 |
| KR | 10-2004-0027663 | 4/2004 |
| WO | WO 98/08290 | 2/1998 |
| WO | WO 99/41829 | 8/1999 |

* cited by examiner

*Primary Examiner*—Tran Nguyen

(57) ABSTRACT

A generating motor using magnetic vector includes at least one vector system using vector action and serving as a driving part, and at least one current system using magnetic current and serving as a generating part.

23 Claims, 15 Drawing Sheets

GENERATING MOTOR USING MAGNETISM'S VECTOR

TECHNICAL FIELD

The present invention relates to a generating motor, and more particularly, to a generating motor using magnetic vector, which can increase energy efficiency using a magnetic vector and a magnetic current.

BACKGROUND ART

Generally, a motor is a device for generating a rotational force. The construction and operation of the motor is fully described, for example, in Korean Laid-Open Publication No. 10-1999-0013313. Therefore, the description thereof will be omitted.

Further, a generator for generating electricity by magnetic force of a magnet is well known, for example, in Korean Patent Application No. 10-2004-0011723 in which the construction and operation of the generator is described in detail. Therefore, the description thereof will be also omitted.

Meanwhile, a conventional generator is essentially provided with a rotor and a stator. The rotor is rotated at an inside or outside of the stator, thereby generating electricity.

Furthermore, the rotor is provided with a plurality of permanent magnets arranged on a circumference thereof at regular intervals, and the stator is provided with a plurality of electromagnets on a circumference thereof at regular intervals.

If external power is applied to the generator as described above, the permanent magnets of the rotor and the electromagnets of the stator are interacted with each other so as to generate the electricity.

However, in the conventional generator, the permanent magnets of the rotor are radially arranged along the circumference, and the radial arrangement is generally in the form of a line. The electromagnets of the stator are also radially arranged along the circumference corresponding to the arrangement of the permanent magnets of the rotor, and the radial shape of the stator is in the form of a line.

In addition, the radial shapes of the stator and the rotor are positioned on a straight line with a shaft of the rotor as a starting point.

Accordingly, when the electromagnets of the stator is interacted with the permanent magnets of the rotor, since the electromagnets of the stator and the permanent magnets of the rotor are positioned on the straight line, an energy consumption rate is increased, and thus an energy efficiency is lowered.

In other words, since the radial shapes of the stator and the rotor are in the form of a straight line, electromagnetic force generated from the electromagnets of the stator and magnetic force generated from the magnets of the rotor are repulsed against each other.

The repulsive force is acted as pressure on the stator and a rotational shaft to which the rotor is coupled, and a large amount of the repulsive force is thus consumed. Therefore, only a part of the external energy is used to substantially rotate the rotor.

Therefore, in the conventional generator, there is a problem that the energy consumption rate is increased and a generating efficiency is lowered.

DISCLOSURE OF THE INVENTION

Accordingly, the present invention is directed to a generating motor that substantially obviates one or more of the problems due to limitations and disadvantages of the related art.

An object of the present invention is to provide a generating motor using magnetic vector, which can increase energy efficiency using a magnetic vector and a magnetic current.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

A generating motor using magnetic vector of the present invention includes at least one vector system and at least one current system. Herein, the vector system serves as a driving part using vector action, and the current system serves as a generating part using magnetic current.

To achieve these and other advantages and in accordance with the purpose of the present invention, as embodied and broadly described, a generating motor using magnetic vector, comprises at least one vector system having a vector stator and a vector rotor, and serving as a driving part; at least one current system having a current stator and a current rotor, and serving as a generating part; and a rotational shaft to which the vector rotor and the current rotor are fixed coupled so as to be rotated.

According to the present invention, the current system generates electricity using rotational force of the vector system, thereby obtaining the electricity.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

In the present invention, an advantage of vector motion is applied to a generating motor using magnetic vector, thereby improving an efficiency of the generator.

The vector motion is an idea that is widely known in the field of mathematics and physics and also applied to skeletal structures of animals in order to increase their motion efficiency.

Moreover, in U.S. Pat. Nos. 4,995,627, 5,064,212 and 5,505,490, there are some examples that a basic principle of the vector motion is applied to mechanical motion so as to increase an efficiency of the mechanical motion.

Meanwhile, a generating motor using magnetic vector according to the present invention is divided into two large parts, i.e., a driving part and a generating part. The driving part is defined as a vector system, and the generating part is defined as a current system.

The vector system is to receive external energy (herein, external power) and generate rotational force. The advantage of the vector motion is used to harmonize repulsive force, attractive force and resultant force, thereby improving an efficiency of the system.

Further, the current system is rotated using the rotational force generated from the vector system, and generates electricity. An efficiency of this system can be also improved by using the advantage of the vector motion.

The generating motor using magnetic vector according to the present invention generates the electricity in the current system by using a part of the rotational force generated from the vector system. Some of remain part of the rotational force may be used as torque for driving other object.

That is, the generating motor using magnetic vector of the present invention can utilize waste energy, which is not used in the conventional generating motor or generator, through flow of the magnetic vector so as to generate the electricity and the torque.

Therefore, the present invention is very useful in an aspect of the energy efficiency. Hereinafter, preferred embodiments of the present invention will be described in detail with reference to accompanying drawings.

Figure 1:
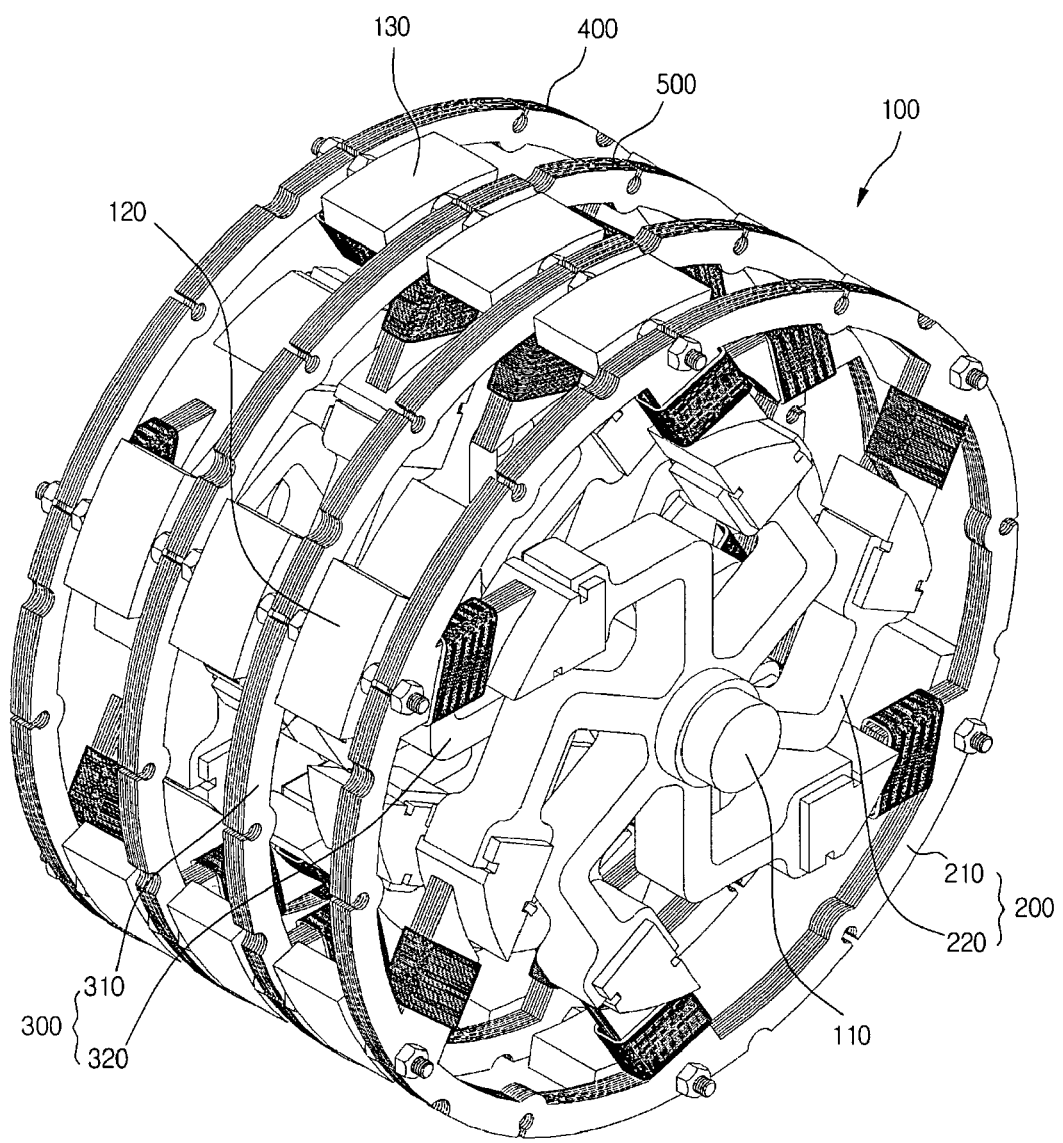
FIG. 1 is a perspective view of a generating motor using magnetic vector according to the present invention.

FIG. 1 is a perspective view of a generating motor using magnetic vector according to the present invention.

Referring to FIG. 1, the generating motor 100 using magnetic vector includes a first vector system 200 used as a driving part for generating rotational force, and a first current system 300 connected with the first vector system 200 and rotated by rotational force generated from the driving part and thus used as a generating part for generating electricity.

The generating motor 100 using magnetic vector further includes a rotational shaft 110 for transmitting the rotational force generated from the first vector system 200 to the first current system 300 and rotating the two systems at the same time.

The first vector system 200 and the first current system 300 are apart from each other with a predetermined distance. There is further provided a first connecting part 120 for transmitting magnetic force between the first vector system 200 and the first current system 300.

In more detail, the first vector system 200 includes a vector stator 210 for generating the electromagnetic force on which a coil is wound, and a vector rotor 220 interacting with the vector stator 210 so as to rotate.

Further, the first current system 300 includes a current stator 310, and a current rotor 320 interacted with the current stator 310 so as to be rotated.

Herein, the generating motor 100 using magnetic vector according to the present invention includes a second vector system 400 having the same elements as the first vector system 200 and a second current system 500 having the same elements as the first current system 300. And, there is further provided a second connecting part 130 having the same construction as the first connecting part 120.

Herein, the second vector system 400, the second current system 500 and the second connecting part 130 is formed to be correspondent to the first vector system 200, the first current system 300 and the first connecting part 120 and have the same elements and shapes.

Therefore, the description of the elements and shapes of the second vector system 400, the second current system 500 and the second connecting part 130 will be substituted with that of the elements and shapes of the first vector system 200, the first current system 300 and the first connecting part 120, and repeated description thereof will be omitted.

Meanwhile, the first vector system 200 and second vector system 400 are repeatedly switched on and off, so that the power is alternately applied to them and the rotational force is always applied to the rotational shaft 110. The switching operation is controlled by a controlling part (not shown).

Figure 2:
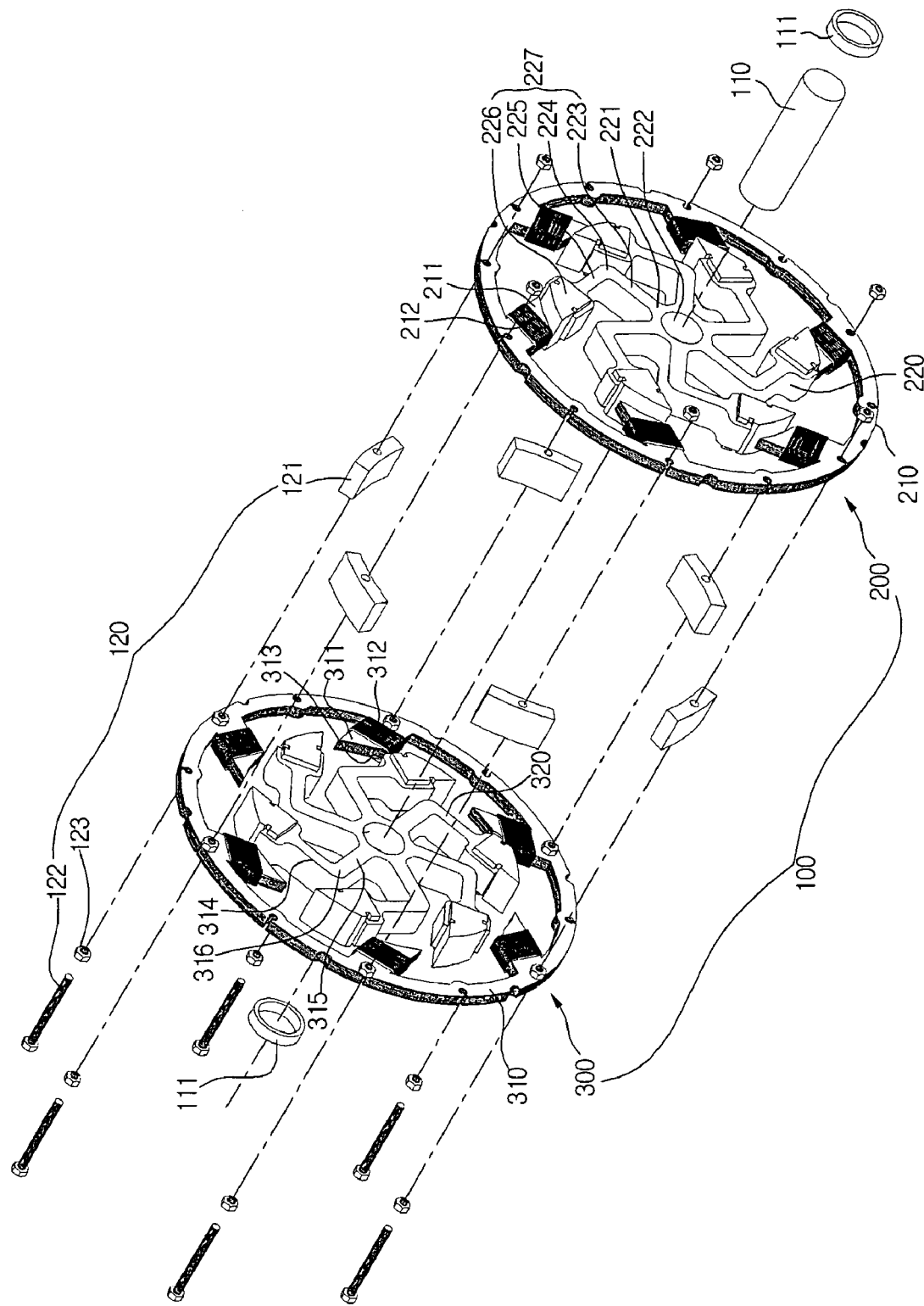
FIG. 2 is an exploded perspective view of the generating motor using magnetic vector according to the present invention.

FIG. 2 is an exploded perspective view of the generating motor using magnetic vector according to the present invention.

Herein, only the first vector system 200, the first current system 300 and the first connecting part 120 are shown in FIG. 2. The second vector system 400, the second current system 500 and the second connecting part 130 are omitted because they are respectively the same as the first vector system 200, the first current system 300 and the first connecting part 120.

Referring to FIG. 2, the generating motor 100 using magnetic vector includes the first vector system 200 as the driving part for generating the rotational force, and the first current system 300 as the generating part for generating the electricity by the rotational force generated from the first vector system 200.

In addition, the generating motor 100 using magnetic vector further includes the rotational shaft 110 for rotating the two system at the same time, and a fixing ring 111 for fixing the rotational shaft 110. There is also provided the first connecting part 120 for transmitting the magnetic force between the two systems.

In more detail, the first vector system 200 includes the vector stator 210 for generating the electromagnetic force, and the vector rotor 220 interacting with the vector stator 210 so as to be rotate.

In the concrete, the vector stator 210 is provided with at least one stator pole 211 which is protruded from an inner circumference and then bent with a predetermined angle from a tangent line of a corresponding outer circumference, and a coil 212 wound on the stator pole 211 so that the stator pole 211 functions as an electromagnet when the external power is supplied.

Meanwhile, the vector rotor 220 is formed with a rotor body 221 and a fitting hole 222, which is formed at a center portion of the rotor body 221 and to which the rotational shaft 110 is fitted.

Further, the vector rotor 220 includes at least one reaction bar 223 extended from the rotor body 221, a bending portion 224 bent from the reaction bar 223 at a desired angle, an action bar 225 extended from the bending portion 224, and an permanent magnet 226 fixed to an end of the action bar 225.

Hereinafter, the element which is formed with the reaction bar 223, the bending portion 224, the action bar 225 and the permanent magnet 226 is called a vector rotor arm 227.

It is preferred that six vector rotor arms 227 are extended from the vector rotor body 221. However, the present invention is not limited to this. While for convenience in this preferred embodiment of the present invention, the vector rotor 220 has six vector rotor arms 227.

Further, an end of the permanent magnet 226, which is faced to a distal end of the stator pole 211, is a North pole (N pole) or a South pole (S pole). For convenience in this embodiment of the present invention, all of the permanent magnets 226 have the N pole.

Meanwhile, the first vector system 200 and the first current system 300 is apart from each other with a predetermined distance by the connecting part 120. The connecting part 120 has at least one connecting member 121 that functions as a path through which the magnetic force is passed.

Further, the connecting part 120 has at least one bolt 122 and nut 123 as a fastening member for fastening the connecting member 121, the first vector system 200 and the first current system 300 to each other.

The connecting part 120 is formed of a metallic material such as iron so that the vector stator 210 and the current stator 310 are magnetically connected to each other.

Therefore, if the vector stator 210 as the electromagnet has the N pole, the current stator 310 has the S pole. If the vector stator 210 has the S pole, the current stator 310 has the N pole.

Due to formation of such magnetic pole as described above, the rotational force of the generating motor 100 using magnetic vector is further increased.

Meanwhile, the first current system 300 includes the current stator 310, and the current rotor 320 interacting with the current stator 310 so as to be rotate.

In detail, the current stator 310 is provided with at least one stator pole 311 which is protruded from an inner circumference and then bent with a predetermined angle from the tangent line of a corresponding outer circumference, and a coil 312 wound on the stator pole 311 so as to generate introduced electricity when the current rotor 320 is rotated.

In more detail, an end of the stator pole 311, which is faced with the current rotor 320, has a chamfered surface 313 at a rear side on the basis of a rotational direction of the current rotor 320.

This allows the current rotor 320 to be completely deviated from the end of the stator pole 311 formed on the current stator 310, when the vector rotor 220 is rotated and faced with one side of the end of the stator pole 211 formed on the vector stator 210.

Therefore, when the vector rotor 220 is faced with the end of the stator pole 211, attractive force is applied between the current stator 310 having the N pole and the stator pole 311, thereby preventing a phenomenon of reducing the rotational force of the vector rotor 220.

Meanwhile, the current rotor 320 is formed with an action bar 314, a bending portion 316 and reaction bar 315.

Herein, the current stator 310 and the current rotor 320 have the same construction elements and shapes as the vector stator 210 and the vector rotor 220. Therefore, the repeated description thereof will be omitted.

Figure 3:
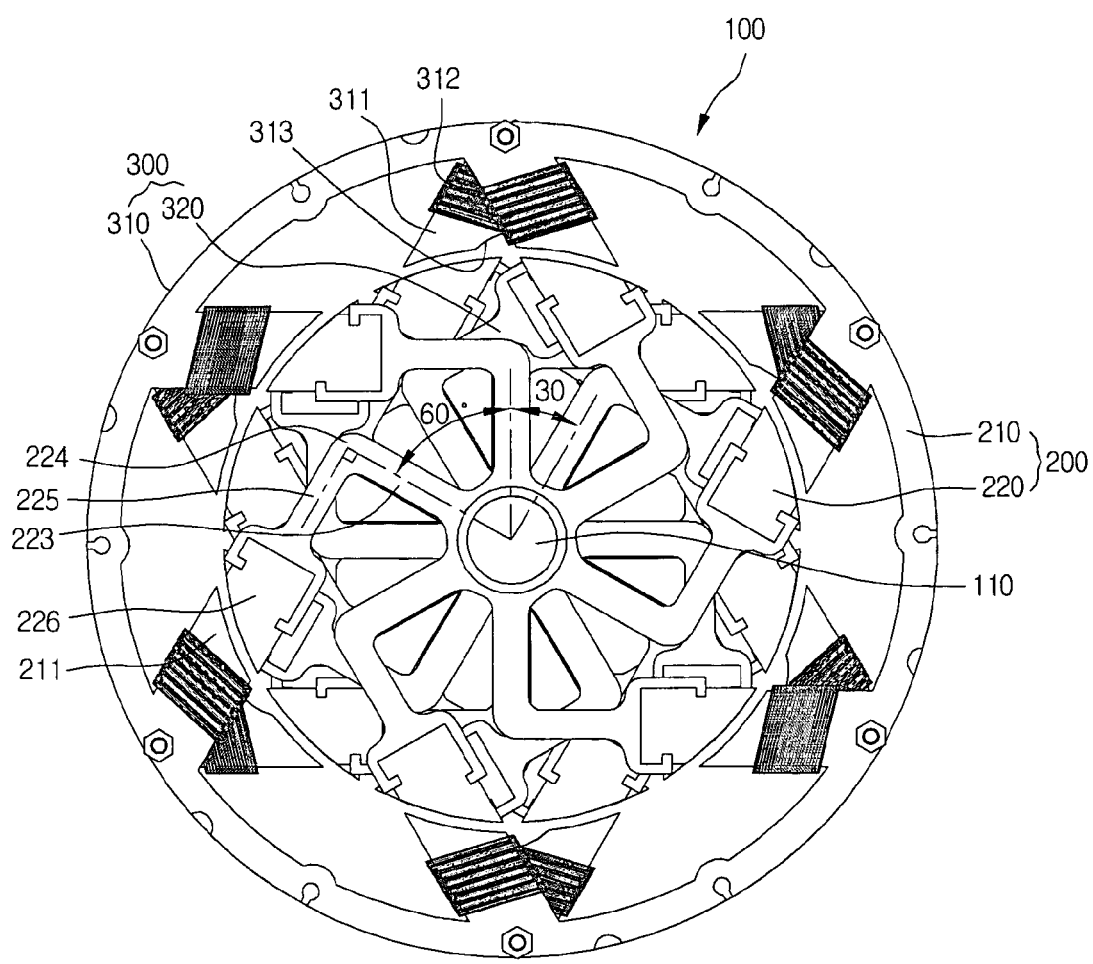
FIG. 3 is a view showing a status that the generating motor using magnetic vector according to present invention is assembled.

FIG. 3 is a view showing a status that the generating motor using magnetic vector according to present invention is assembled.

Referring to FIG. 3, the generating motor 100 using magnetic vector includes the first vector system 200 as the driving part, the first current system 300 as the generating part and the rotational shaft 110 for rotating the two systems at the same time.

The first vector system 200 is formed with the vector stator 210 for generating electromagnetic force, and the vector rotor 220 interacting with the vector stator 210 so as to be rotate.

The vector rotor 220 includes the reaction bar 223 extended from the rotor body 221, the bending portion 224 bent from the reaction bar 223, the action bar 225 extended from the bending portion 224, and the permanent magnet 226 fixed to an end of the action bar 225.

Meanwhile, the vector stator 210 is formed with the stator pole 211 which is protruded from the inner circumference and then bent with a predetermined angle from the tangent line of the corresponding outer circumference.

Further, the current system 300 includes the current stator 310, and the current rotor 320 interacting with the current stator 310 so as to be rotate.

In detail, the current stator 310 is formed with the stator pole 311, the coil 312 and the chamfered surface 313.

Herein, in case the vector system 200 has six vector rotor arms, the adjacent vector rotor arms have an angle of about 60° therebetween.

Further, the reaction bar 223 of the vector system 200 and the reaction bar 315 of the first current system 300 have an angle of about 30° therebetween.

That is, the current rotor arm of the current system 300 is positioned at a middle portion between the vector rotor arms of the first vector system 200. In other words, the vector rotor arm of the first vector system 200 and the current rotor arm of the first current system 300 are arranged in a zigzag pattern.

Due to the bending portion 224, the reaction bar 223 and the action bar 225 have an angle of about 90° therebetween.

That is, the action bar 225 has the angle of about 90° with respect to a rotational center. Therefore, when the force generated by the interaction between the magnetic force of the permanent magnet 226 and the electromagnetic force of the stator pole 211 is transmitted to the action bar 225, the whole transmitted force can be converted into the torque.

According to the present invention, it is prevented that only a small amount of the force which is derived from the interaction between the magnetic force of the permanent magnet 226 and the electromagnetic force of the stator pole 211. Therefore, the generating efficiency according to the present invention can be improved.

Meanwhile, the vector rotor 220 and the current rotor 320 have the same shape, but each rotor 220, 320 is reversely arranged to each other.

The end of the stator pole 211 is curved to have a concave surface. The end of the permanent magnet 226 corresponding to the stator pole 211 is also curved to have a convex surface that is apart from the concave surface at a desired distance.

A curving center of each curved surface formed on the ends of the stator pole 211 and the permanent magnet 226 is coincided with a center of the rotational shaft 110.

By the above-mentioned construction, the vector rotor 220 and the current rotor 320 can be facilely rotated in the vector stator 210 and the current stator 310.

FIGS. 4 to 9 are views showing a status of an operation of the generating motor using magnetic vector according to the present invention, and FIG. 10 to 15 are views showing a status of an operation of the current system of the generating motor using magnetic vector according to the present invention.

Referring to FIGS. 4 to 15, the operation of the generating motor using magnetic vector according to the present invention will be described.

Since the construction and shapes of the generating motor 100 using magnetic vector is already described with reference to FIG. 1 to 3, the description thereof is omitted.

Figure 4:
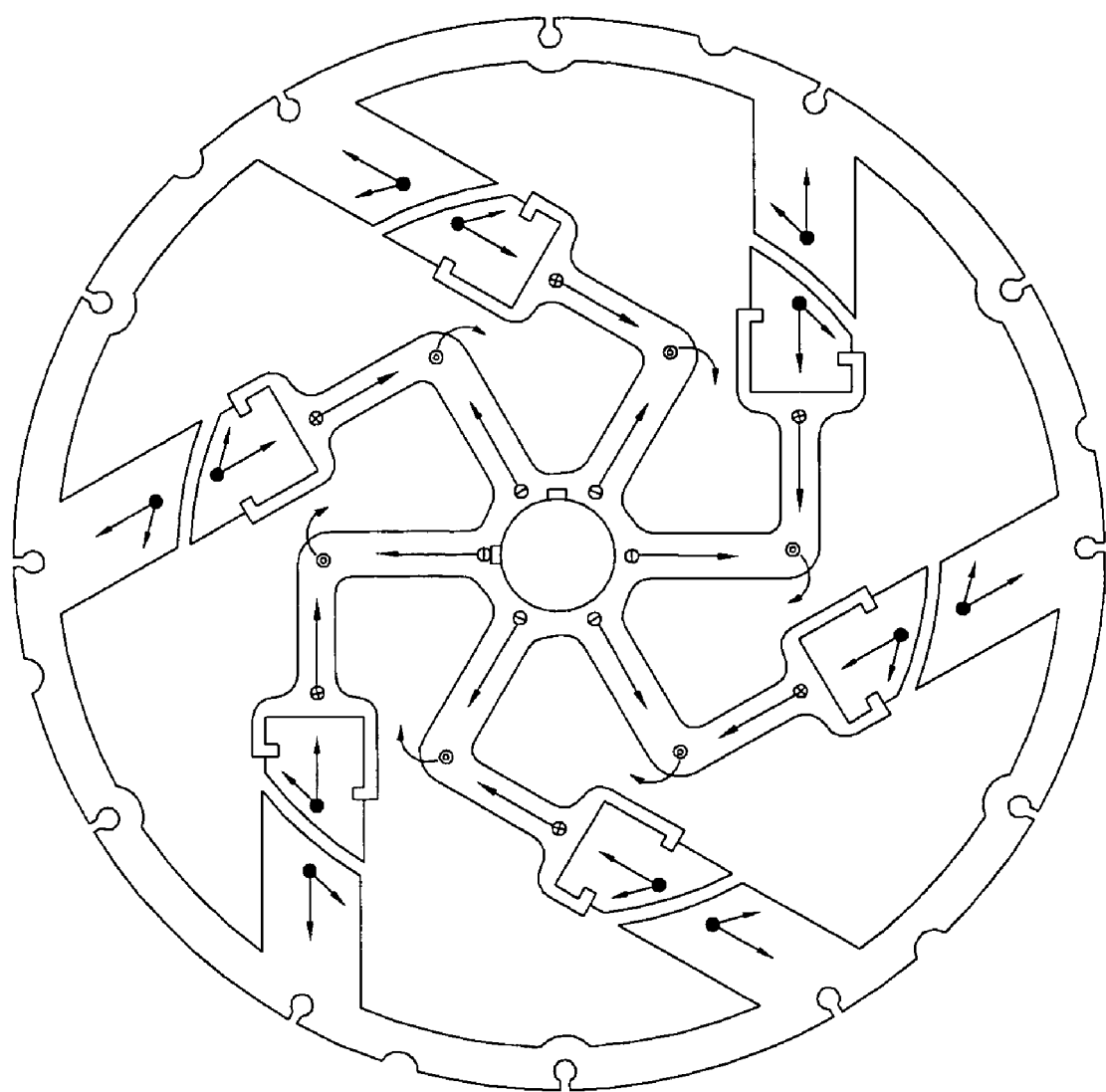
FIG. 4 is a view showing a status that a first vector system of the generating motor using magnetic vector according to present invention starts its operation.
Figure 5:
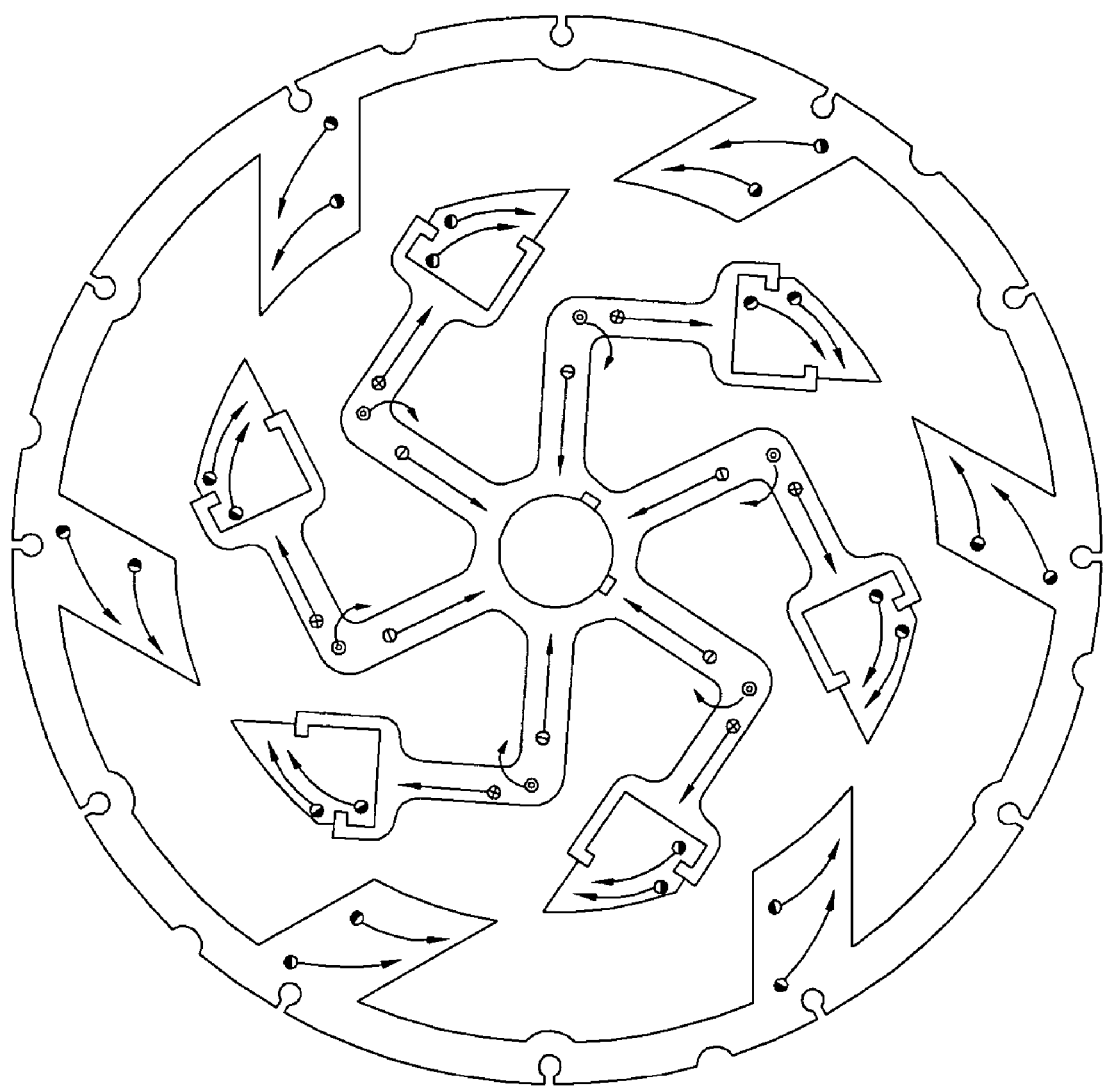
FIG. 5 a view showing a status that a first current system of the generating motor using magnetic vector according to present invention starts its operation.

Special marks indicated in FIGS. 5 to 15 are as follows:

FIG. 4 is a view showing a status that a first vector system of the generating motor using magnetic vector according to present invention starts its operation, and FIG. 5 a view showing a status that a first current system of the generating motor using magnetic vector according to present invention starts its operation.

From a functional point of view, since the first current system 300 functions as the driving part, which is the same as the first vector system 200, the first current system 300 can be regarded as the first vector system.

Referring to FIGS. 4 and 5, the vector rotor 220 of the first vector system 200 is positioned facing the stator pole 211 of the vector stator 210. The current rotor 320 of the first current system 300 is positioned facing the distal end portion of the stator pole 311.

If the external power is supplied to the generating motor 100 using magnetic vector, the power is applied to the coil 212 of the first vector system 200, and the stator pole 211 functions as the electromagnet.

At this time, if the stator pole 211 has the N pole, the magnetic force is transmitted through the first connecting part 120. Then the stator pole 311 of the current stator 310 has the S pole, and the distal end of the permanent magnet 226 of the vector rotor 220 faced with the stator pole 211 has the N pole. Also, the end of the permanent magnet of the current rotor 320 faced with the current stator 310 has the N pole.

As shown in FIG. 4, repulsive vector is generated in the stator pole 211 and the permanent magnet 226, since the electromagnetic force of the stator pole 211 and the magnetic force of the permanent magnet 226 of the vector rotor 220 are repulsed against each other. Herein, the repulsive vector is acted on the action bar 225 to form active vector,

TABLE 1

| Symbol | Magnetic vector | |
|---|---|---|
| | Term | Meaning |
| ⊙→ | Resultant vector | Acted from bending portion to rotational direction of vector rotor |
| ⊕→ | Active vector | Acted from action bar to bending portion |
| ⊖→ | Reactive vector | Acted from reaction bar to bending portion |
| ●→ | Repulsive vector | Acted in a repulsive direction to each other due to the same magnetic poles |
| ◐→ | Attractive vector | Acted in an attractive direction to each other due to different magnetic poles |
| ○→ | Centrifugal vector | Acted in a rotational direction |
| ⊙→ | Component | Acted from bending portion to rotational direction of current rotor |
| ▷∼▶ | Magnetic current | Magnetic current in rotor and stator | and The active vector is applied to the bending portion 224. And reactive vector is generated at the reaction bar 223 due to repulsive force. The reactive vector is also acted on the bending portion 224. Then, at the bending portion 224, there is formed resultant vector as resultant force of the active vector and the reactive vector.

The resultant vector generated on the vector rotor 220 is served as the torque, and the vector rotor 220 is rotated.

At this time, as described above, the action bar 225 is formed to a tangential direction with respect to a rotational center. The active vector can be transmitted to resultant vector without being wasted.

Therefore, the rotational force of vector rotor 120 effectively increases.

Meanwhile, the current rotor 320 begins to rotate, when the vector rotor 220 begins to rotate as shown FIG. 4.

With reference to FIG. 5, this is described in more detail.

As described above, when the vector rotor 220 begins to rotate, the stator pole 211 of the vector stator 210 has the N pole, and the stator pole 311 of the current stator 310 connected with the vector stator 210 by the first connecting part 120 has the S pole.

At this time, the current rotor 320 is positioned between the stator poles of the current stator 310, while the distal end thereof 320 is faced with the distal end of the stator pole 311. The stator pole 311 having the S pole is interacted with the permanent magnet of the current rotor 320 having the N pole, so that attractive vector is generated in the stator pole 311 and the permanent magnet of the current rotor 320.

Then, the attractive vector is acted on the action bar 314 of the current rotor 320, and the reactive vector is generated at the reaction bar 315 of the current rotor 320 due to the repulsive force. And at the bending portion 316 of the current rotor 320, there is formed component vector as the resultant vector of the active vector and the reactive vector.

The component vector formed on the current rotor 320, as described above, is served as the torque, and the current rotor 320 begins to rotate.

Meanwhile, the current rotor 320 receives rotational force generated by the rotation of the vector rotor 220 through the rotational shaft 110.

Therefore, the rotational force by the rotation of the vector rotor 220 and the rotational force by the current rotor 320 is added each other, and then serves as rotational force of the generating motor using magnetic vector.

According to the present invention, the electromagnetic force and the magnetic force that are offset each other in the conventional generating motor can be efficiently utilized, thereby remarkably improving the energy efficiency. The improvement of the energy efficiency can be proved through an experiment.

Since the number of vector rotors 220 and current rotors 320 is set to six in this embodiment, the resultant force and the component force is acted on the six portions, and the whole force is converted into the rotational force.

Figure 6:
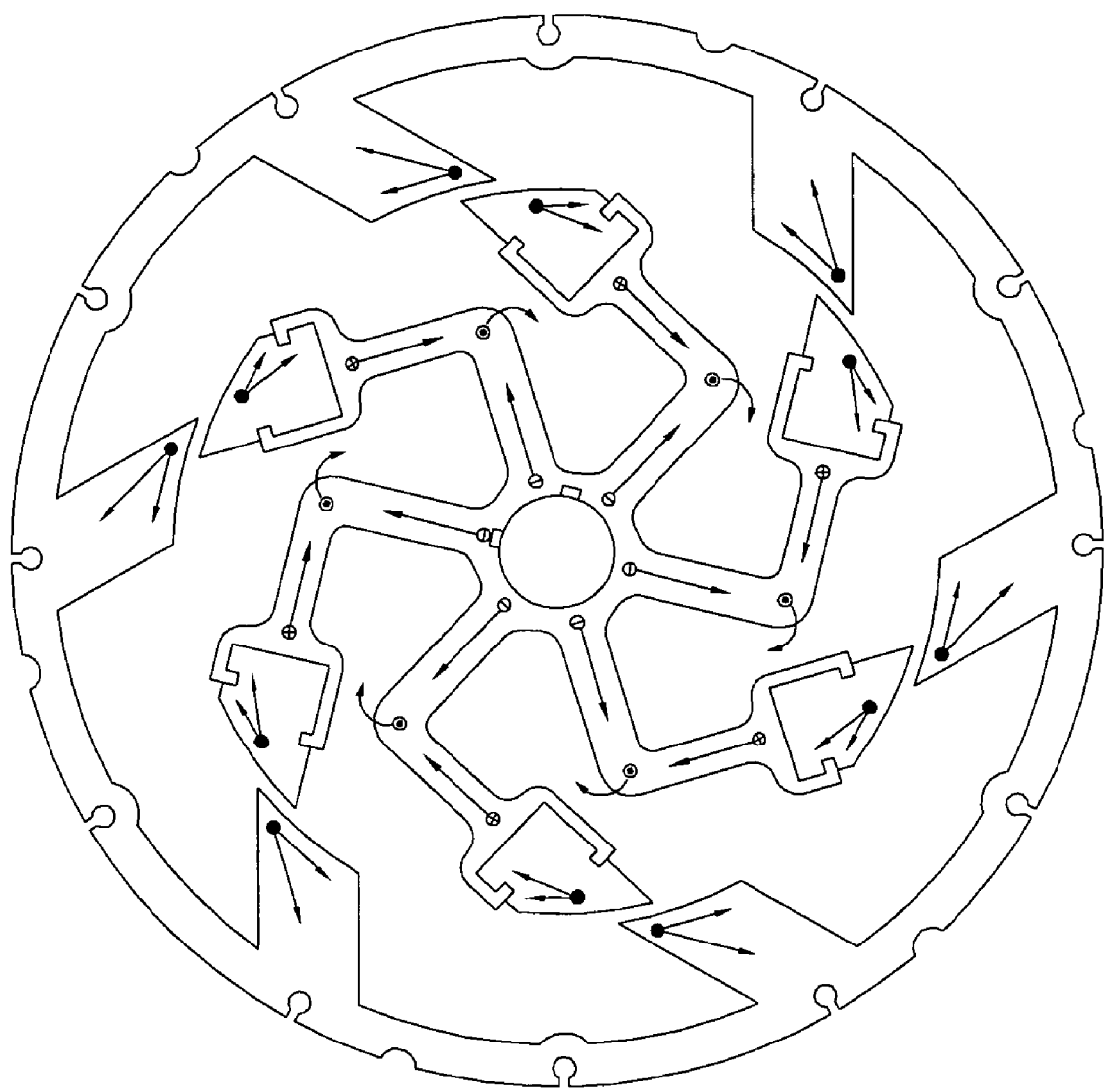
FIG. 6 a view showing a status that the first vector system of the generating motor using magnetic vector according to present invention is rotated at a desired angle.
Figure 7:
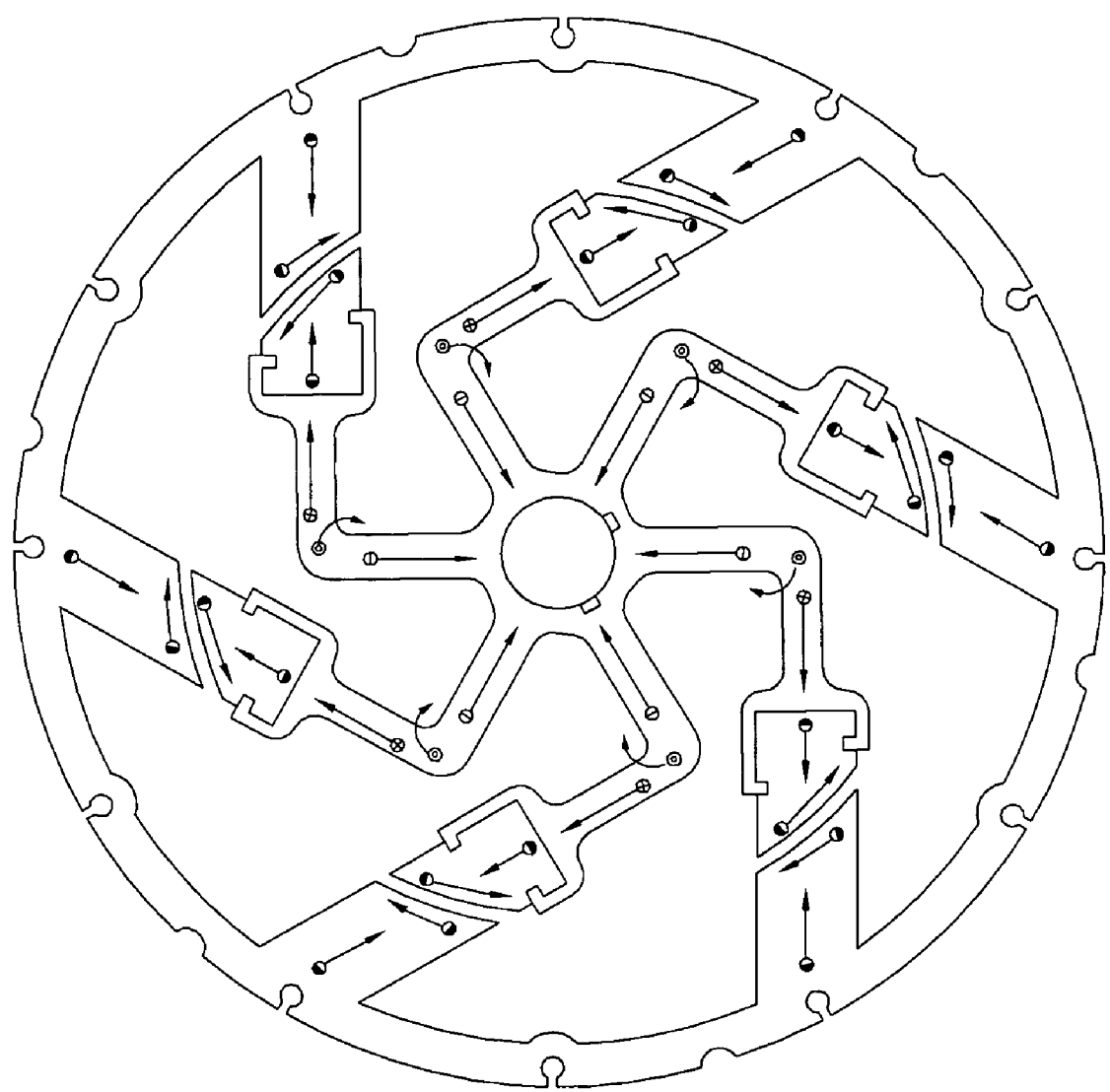
FIG. 7 a view showing a status that the first current system of the generating motor using magnetic vector according to present invention is rotated at a desired angle.

FIG. 6 a view showing a status that the first vector system of the generating motor using magnetic vector according to present invention is rotated at a desired angle, FIG. 7 a view showing a status that the first current system of the generating motor using magnetic vector according to present invention is rotated at a desired angle.

Figure 8:
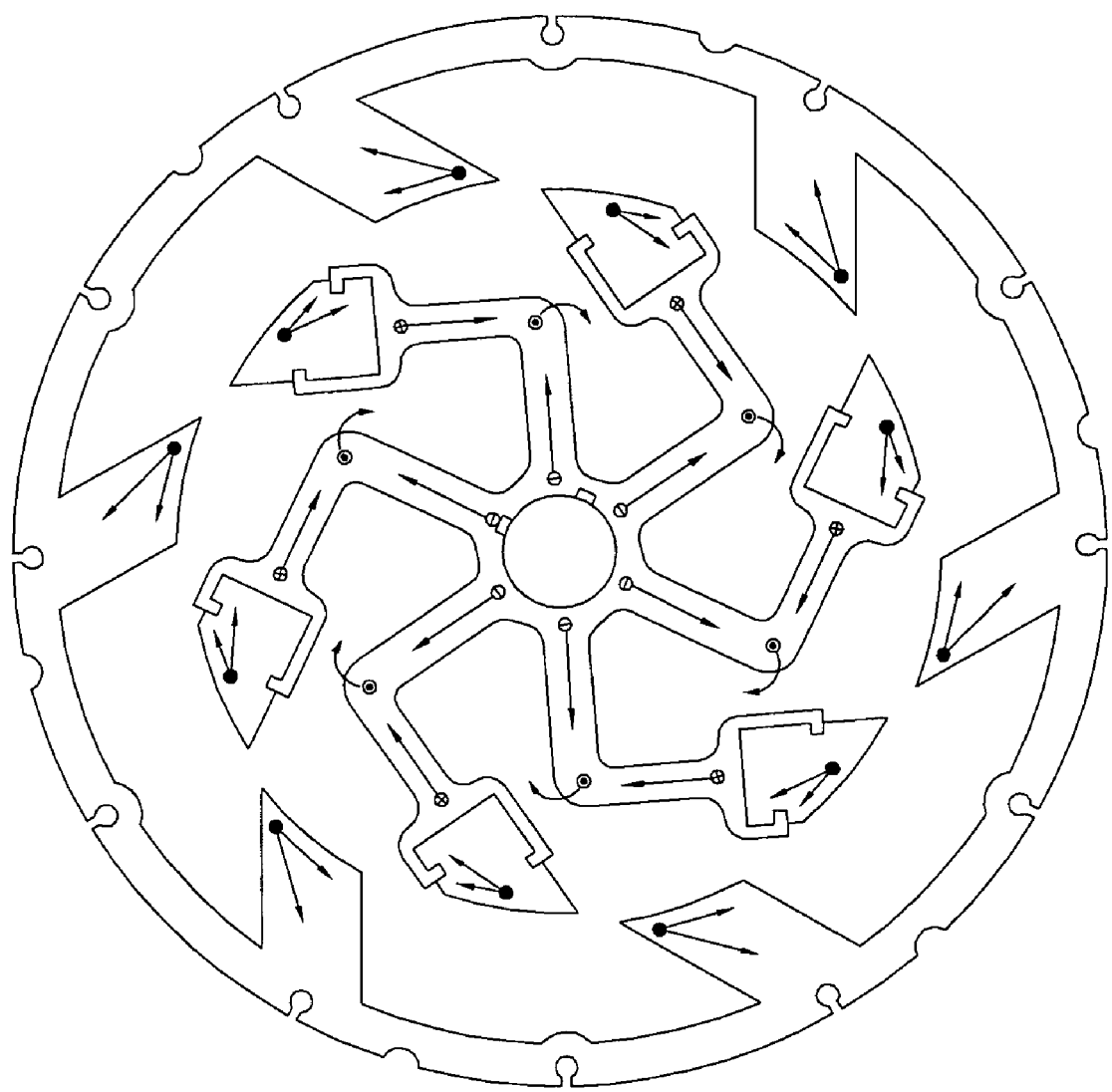
FIG. 8 a view showing a status that the first vector system of the generating motor using magnetic vector according to present invention is rotated at an angle of about 30°.
Figure 9:
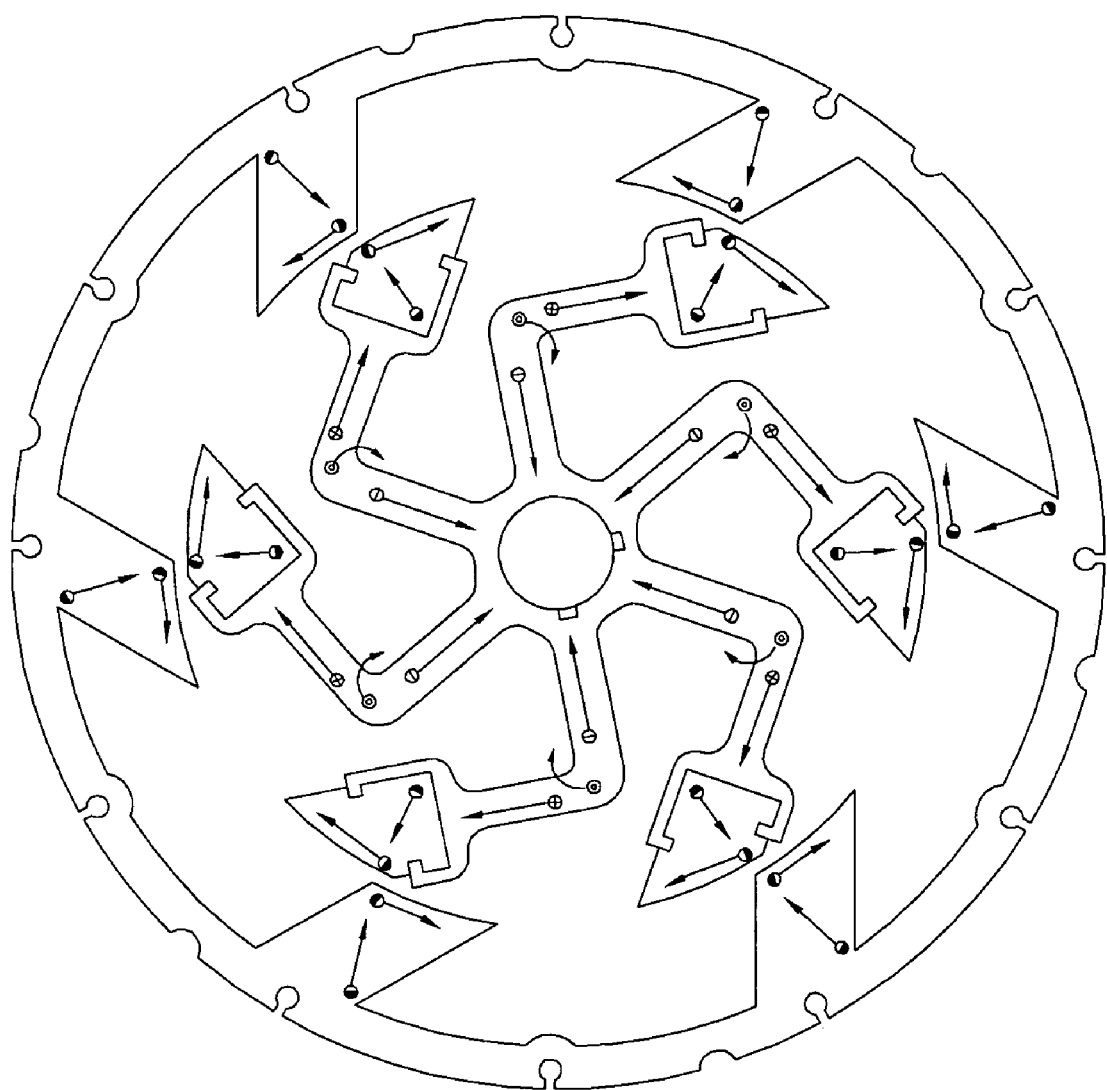
FIG. 9 a view showing a status that the first current system of the generating motor using magnetic vector according to present invention is rotated at an angle of about 30°.

Further, FIG. 8 a view showing a status that the first vector system of the generating motor using magnetic vector according to present invention is rotated at an angle of about 30°, and FIG. 9 a view showing a status that the first current system of the generating motor using magnetic vector according to present invention is rotated at an angle of about 30°.

Referring to FIGS. 6 to 9, the power is supplied to the first vector system 200 until the vector rotor 220 and the current rotor 320 is rotated to the angle of about 30° from a position shown in FIGS. 4 and 5 to a position shown in FIGS. 8 and 9.

Therefore, until the vector rotor 220 and the current rotor 320 are rotated to the angle of about 30° from the starting position, the first vector system 200 continuously generates the rotational force.

Meanwhile, if the vector rotor 220 and the current rotor 320 reach the desired position, the power is cut off by a controlling part (not shown) and is no more supplied to the first vector system 200.

At this time, the controlling part is adapted to supply the power to the second vector system 400, and thus the second vector system 400 and the second current system 500 begin to serve as the driving part.

The operation of the second vector system 400 and the second current system 500 as the driving part is the same as that of the first vector system 200 and the first current system 300 shown in FIGS. 4 to 9. Therefore, the description thereof will be omitted.

As described above, according as the power is alternately supplied to the first vector system 200 and the second vector system 400, the torque can be continuously supplied to the rotational shaft 110. Thus, the generating motor 100 using magnetic vector of the present invention can be facilely operated.

Meanwhile, the rotational shaft 110 is continuously rotated by the first vector system 200 and the second vector system 400. Thus, the first and second current systems 300 and 500 are continuously rotated by the rotation of the rotational shaft 110.

By such rotation, current is induced and generated at the first and second current systems 300 and 500, the generated current can be transferred through the coils wound on the current stators of the systems to the outside.

Figure 10:
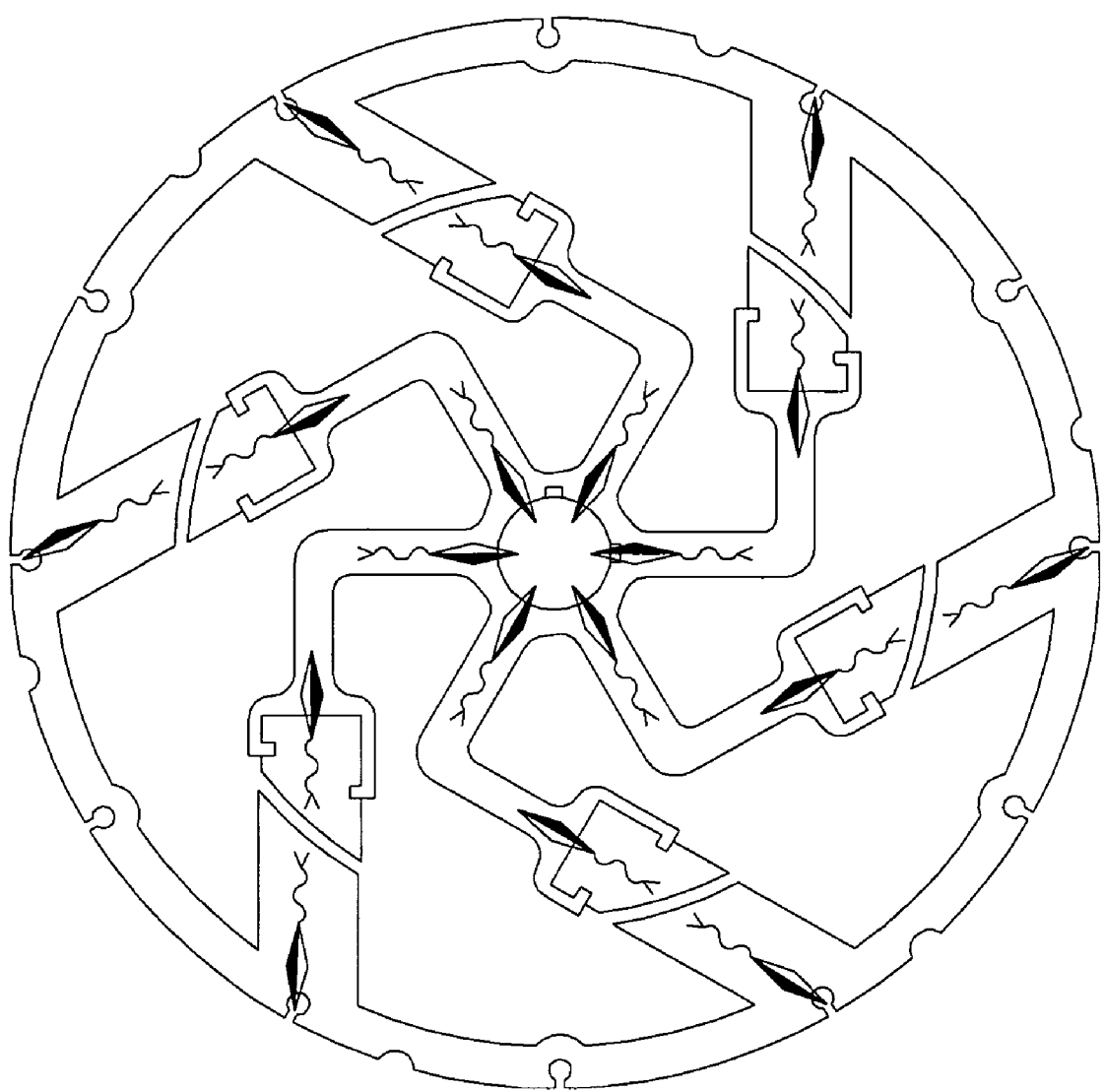
FIG. 10 a view showing a status that the first vector system of the generating motor using magnetic vector according to present invention starts its operation so as to generate electricity.
Figure 11:
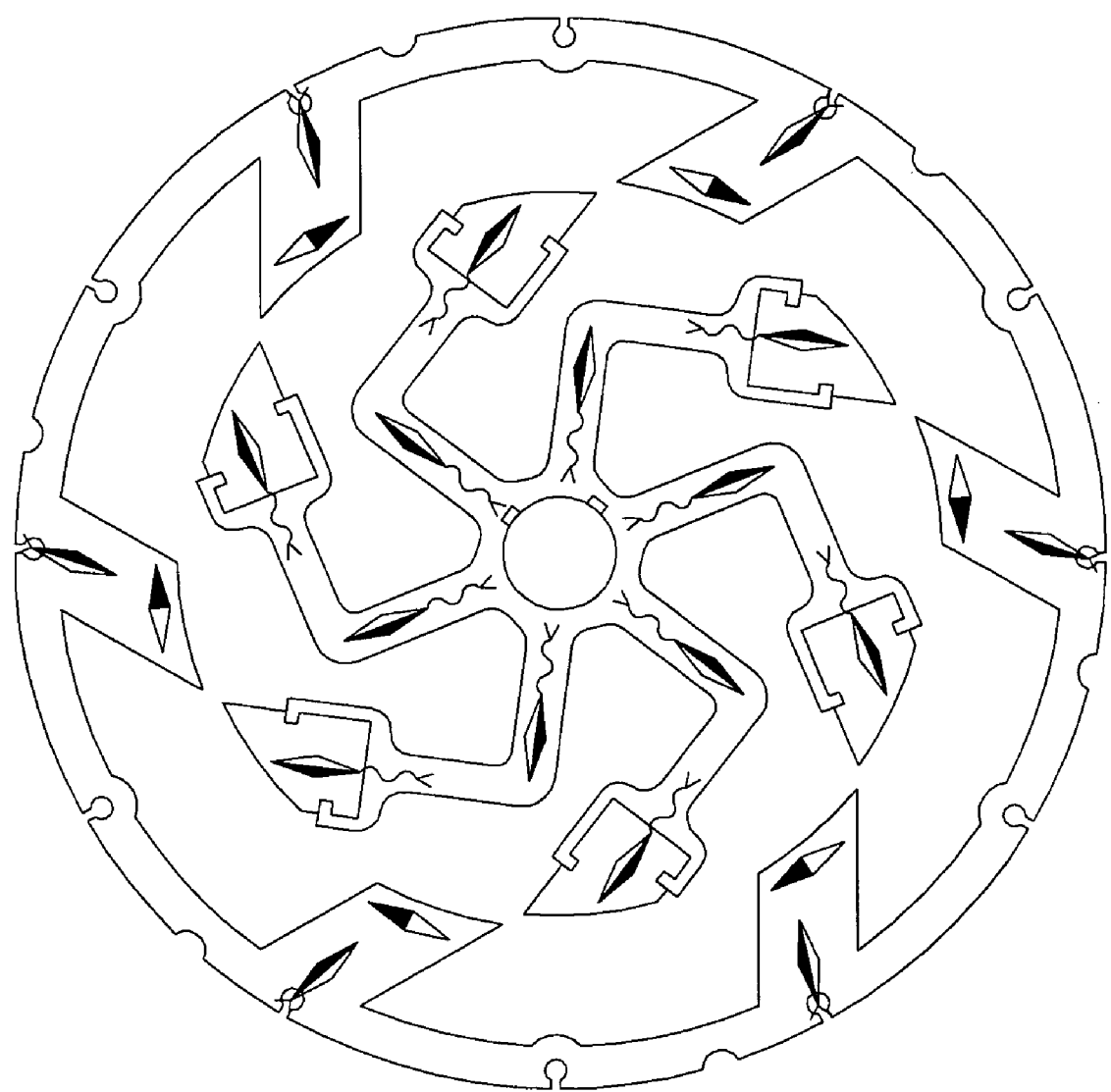
FIG. 11 a view showing a status that the first current system of the generating motor using magnetic vector according to present invention starts its operation so as to generate electricity.
Figure 12:
FIG. 12 a view showing a status that the first vector system of the generating motor using magnetic vector according to present invention is rotated at a desired angle so as to generate electricity.
Figure 13:
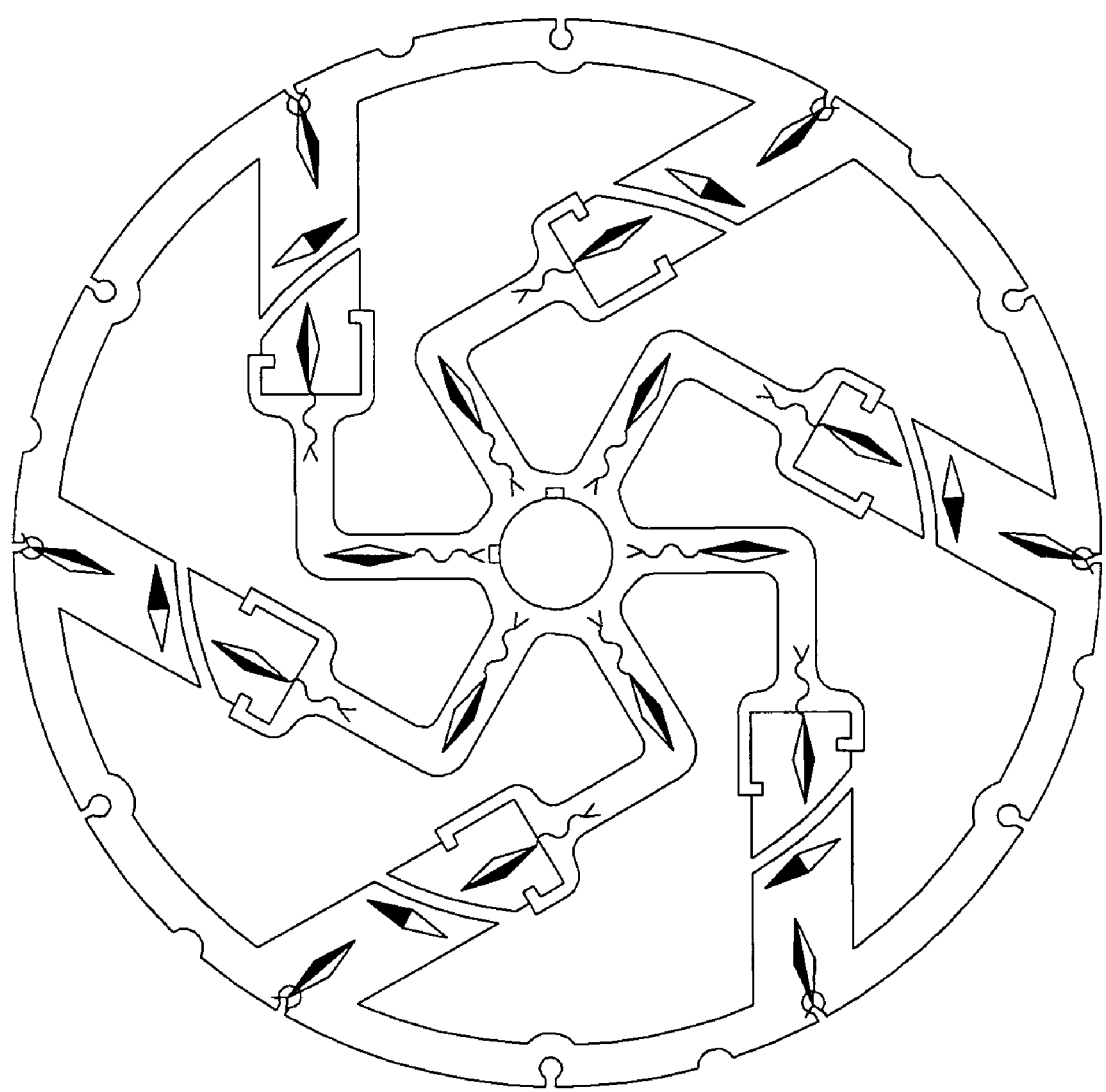
FIG. 13 a view showing a status that the first current system of the generating motor using magnetic vector according to present invention is rotated at a desired angle so as to generate electricity.

FIG. 10 a view showing a status that the first vector system of the generating motor using magnetic vector according to present invention starts its operation so as to generate electricity, and FIG. 11 a view showing a status that the first current system of the generating motor using magnetic vector according to present invention starts its operation so as to generate electricity;

Further, FIG. 12 a view showing a status that the first vector system of the generating motor using magnetic vector according to present invention is rotated at a desired angle so as to generate electricity, and FIG. 13 a view showing a status that the first current system of the generating motor using magnetic vector according to present invention is rotated at a desired angle so as to generate electricity.

Figure 14:
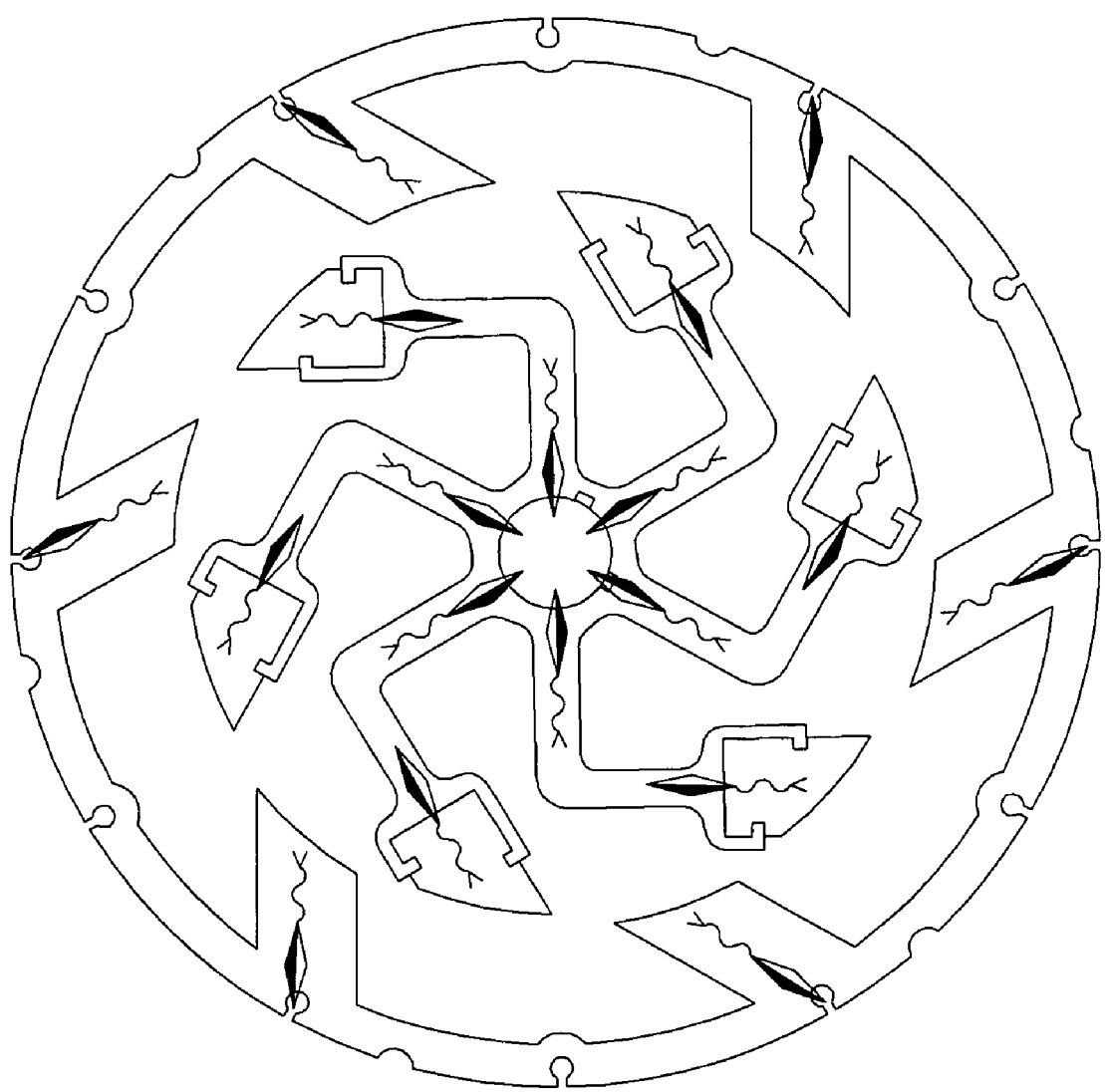
FIG. 14 a view showing a status that the first vector system of the generating motor using magnetic vector according to present invention is rotated at an angle of about 30° so as to generate electricity.
Figure 15:
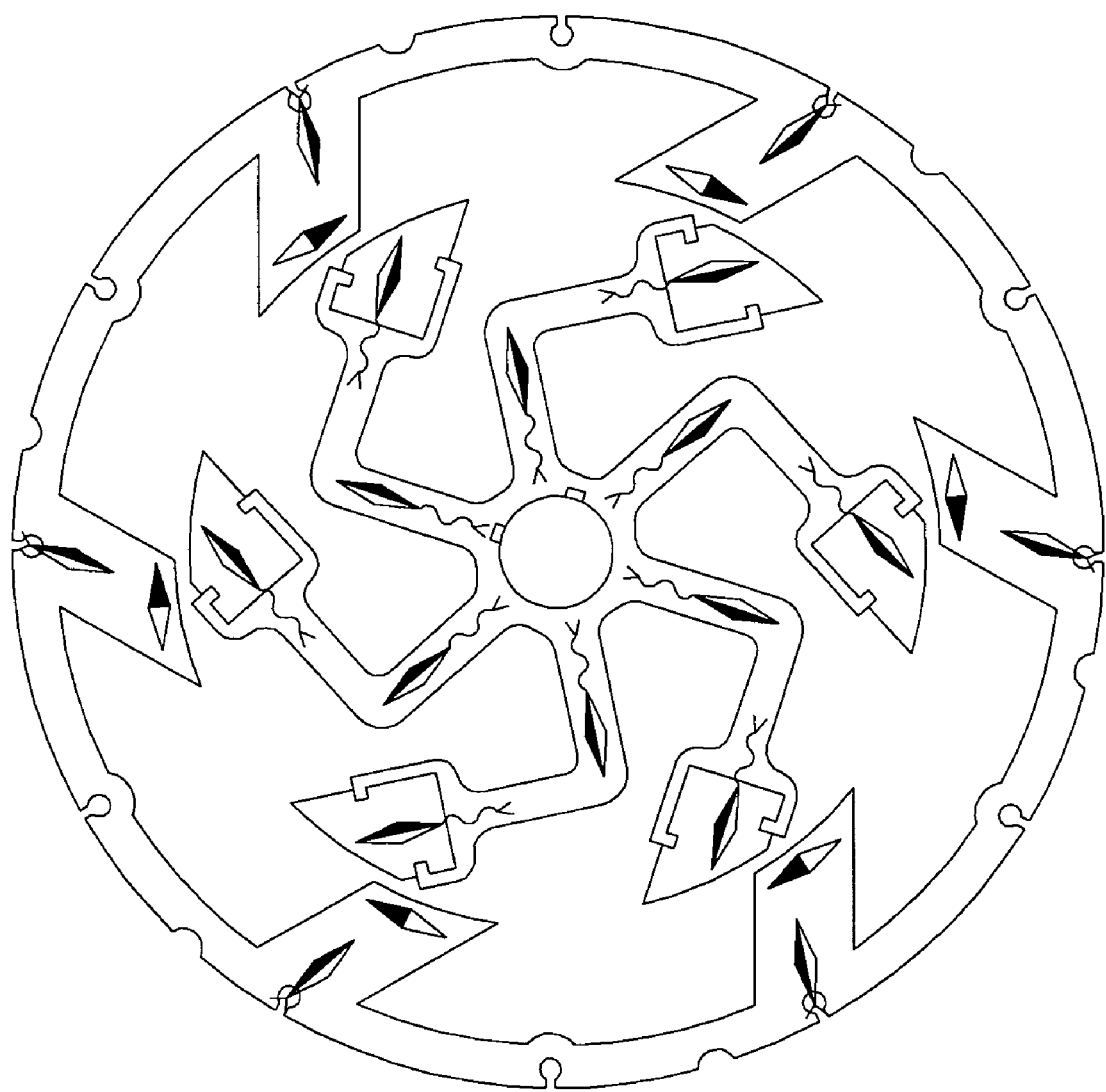
FIG. 15 a view showing a status that the first current system of the generating motor using magnetic vector according to present invention is rotated at an angle of about 30° so as to generate electricity.

Furthermore, FIG. 14 a view showing a status that the first vector system of the generating motor using magnetic vector according to present invention is rotated at an angle of about 30° so as to generate electricity, and FIG. 15 a view showing a status that the first current system of the generating motor using magnetic vector according to present invention is rotated at an angle of about 30° so as to generate electricity.

From a functional point of view, since the first vector system 200 functions as the generating part, which is the same as the first vector system 200, the first vector system 300 can be regarded as the current vector system.

Referring to FIGS. 10 to 15, the vector rotor 220 of the first vector system 200 is interacted with the stator pole 211 of the vector stator 210 so as to be rotated. The distal end of the current rotor 320 of the first current system 300 is interacted with the stator pole 311 of the current stator 310 so as to be rotated.

Meanwhile, the rotational shaft 110 is rotated by the first vector system 200 and the first current system 300 serving as the first vector system.

Then, the electromagnetic force of the stator pole 211 and the magnetic force of the permanent magnet 226 of the vector rotor 220 is repulsed against each other at the first vector system 200 serving as the first current system. Therefore, repulsive current as the magnetic current is generated in the stator pole 211 and the permanent magnet 226.

Then, the repulsive current at the vector rotor side 220 is transmitted through the action bar 225 and the reaction bar 223 to the rotational shaft 110. The repulsive current transmitted to the rotational shaft 110 is transmitted to the current rotor 320 of the first current system 300.

And the repulsive current is transmitted from the current rotor 320 through reaction bar 315 and the action bar 316 to the distal end of the current rotor 320.

Meanwhile, the repulsive current at the vector stator side 210 is transmitted through the first connecting part 120 to the current stator 310 of the first current system 300. The repulsive current transmitted to the current stator 310 is transmitted to the stator pole 311.

Attractive current as the magnetic current is generated at the first current system 300 by the interaction of the permanent magnet of the current stator 310 and the distal end of the current rotor 320.

Therefore, in the first current system 300, the repulsive current and attractive current is transmitted to the stator pole 311 and then transmitted to the coil 312. Thus, the induced current is generated at the coil 312.

Since the first vector system 200 and the second vector system 400 alternately generate the rotational force by the operation of the controlling part, the first current system 300 is continuously rotated so as to serve as the generating part.

This is the same as in the second current system 500.

The first connecting part 120 and/or the rotational shaft 110 have to be formed of a magnetic conductive material so the magnetic current can be facilely transmitted.

According to the generating motor 100 using magnetic vector, the electricity can be obtain from the current system, and at the same time, the rotational force generated from the vector system can be also served as the torque for rotating other object. Therefore, the present invention has all functions as a motor and a generator.

Meanwhile, the magnet used in the rotor is not limited to the permanent magnet. The electromagnet can be also employed.

INDUSTRIAL APPLICABILITY

According to the generating motor 100 using magnetic vector of the present invention, the current system generates the electricity using the rotational force of the vector system, thereby obtaining the electricity.

Further, a part of the rotational force of the vector system can be used as the torque for rotating other object.

Furthermore, by the arrangement and construction of the rotor and the stator according to the present invention, the electromagnetic force and the magnetic force, which cannot utilize in the conventional generating motor, can be converted into the rotational force, thereby improving the energy efficiency.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A generating motor using magnetic vector comprising:
   at least one vector system having a vector stator and a vector rotor, and serving as a driving part;
   at least one current system having a current stator and a current rotor, and serving as a generating part; and
   a rotational shaft to which the vector rotor and the current rotor are fixed coupled so as to be rotated, wherein the vector rotor and the current rotor are reversely arranged to each other.

2. The generating motor according to claim 1, wherein two vector systems are provided.

3. The generating motor according to claim 1, wherein two current systems are provided.

4. The generating motor according to claim 1, wherein at least one connecting part is provided between the vector system and the current system.

5. The generating motor according to claim 1, wherein two vector systems are provided, and the two vector systems are alternately switched on/off so that power is alternately supplied to the two vector systems.

6. The generating motor according to claim 1, further comprising a desired controlling part.

7. The generating motor according to claim 1, wherein the vector stator and/or the current stator includes at least one stator pole, which is protruded from an inner circumference.

8. The generating motor according to claim 1 wherein the vector stator and/or the current stator includes a stator pole which is bent with a predetermined angle from the tangent line of a corresponding outer circumference and a coil wound on the stator pole so that the stator pole functions as an electromagnet when the external power is supplied.

9. The generating motor according to claim 1 wherein the vector stator and/or the current stator includes a permanent magnet fixedly coupled to an end thereof.

10. The generating motor according to claim 1 wherein the vector stator and/or the current stator includes an arm of which at least one portion is bent.

11. The generating motor according to claim 1, wherein the vector stator and/or the current stator can includes six arms.

12. The generating motor according to claim 1, further comprising a connecting part formed of a metallic material.

13. The generating motor according to claim 1, wherein the current stator includes a and the vector stator pole.

14. The generating motor according to claim 1 wherein the current stator includes a stator pole, and a side of an end of the stator pole is chamfered.

15. The generating motor according to claim 1, wherein the current stator includes a stator pole, and an end of the stator pole, which is faced with the current rotor, is chamfered at a rear side on the basis of a rotational direction of the current rotor.

16. The generating motor according to claim 1 wherein the current rotor anti is positioned between the vector rotor arms.

17. The generating motor according to claim 1, wherein an upper piece of the bending portion of the vector rotor and/or the current rotor is directed to a tangential direction of a circumference.

18. The generating motor according to claim 1 wherein the vector rotor and/or the current rotor includes a stator pole, and the stator pole is curved to have a concave surface.

19. The generating motor according to claim 1, wherein the vector rotor arm and/or the current rotor arm includes a permanent magnet at an end thereof, and the permanent magnet is curved to have a convex surface.

20. The generating motor according to claim 1 wherein the vector rotor and/or the current rotor includes a pole, and the vector rotor arm and/or the current rotor arm includes a permanent magnet at an end thereof, and a curving center of each curved surface formed on the ends of the pole and the permanent magnet coincided with a center of the rotational shaft.

21. The generating motor according to claim 1, further comprising:
a connecting part between the vector system and the current system, and the connecting part and/or the rotational shaft is formed of a magnetic conductive material.

22. The generating motor according to claim 21, wherein the vector system and the current system is connected by a connecting member formed of magnetic conductive material.

23. A motor comprising:
a vector system configured to generate a rotational force, the vector system including a vector stator and a vector rotor;
a current system configured to be rotated by the rotational force, the current system having a current stator and a current rotor; and
a shaft configured to transmit the rotational force from the vector system to the current system,
wherein the vector rotor and the current rotor are reversely arranged.

* * * * *